(12) United States Patent
Kuninaka

(10) Patent No.: US 11,241,919 B2
(45) Date of Patent: Feb. 8, 2022

(54) PNEUMATIC TIRE

(71) Applicant: The Yokohama Rubber Co., LTD., Tokyo (JP)

(72) Inventor: Mizuki Kuninaka, Hiratsuka (JP)

(73) Assignee: The Yokohama Rubber Co., LTD.

( * ) Notice: Subject to any disclaimer, the term of this patent is extended or adjusted under 35 U.S.C. 154(b) by 757 days.

(21) Appl. No.: 16/077,723

(22) PCT Filed: Feb. 14, 2017

(86) PCT No.: PCT/JP2017/005361
§ 371 (c)(1),
(2) Date: Aug. 13, 2018

(87) PCT Pub. No.: WO2017/141915
PCT Pub. Date: Aug. 24, 2017

(65) Prior Publication Data
US 2021/0188014 A1   Jun. 24, 2021

(30) Foreign Application Priority Data
Feb. 15, 2016   (JP) .............................. JP2016-025844

(51) Int. Cl.
*B60C 11/12*   (2006.01)
*B60C 11/04*   (2006.01)
*B60C 11/13*   (2006.01)

(52) U.S. Cl.
CPC .......... *B60C 11/1281* (2013.01); *B60C 11/04* (2013.01); *B60C 11/1204* (2013.01);
(Continued)

(58) Field of Classification Search
CPC ............. B60C 11/1204; B60C 11/1281; B60C 2011/1254
See application file for complete search history.

(56) References Cited

U.S. PATENT DOCUMENTS

| | | | | |
|---|---|---|---|---|
| 5,109,901 A | * | 5/1992 | Miyamoto | .......... B60C 11/0306 |
| | | | | 152/209.18 |
| 2010/0084062 A1 | * | 4/2010 | Miyazaki | ............ B60C 11/1281 |
| | | | | 152/209.18 |

(Continued)

FOREIGN PATENT DOCUMENTS

| | | |
|---|---|---|
| DE | 10 2012 109 712 | 4/2014 |
| EP | 0 847 878 | 6/1998 |

(Continued)

OTHER PUBLICATIONS

Machine translation for Japan 62-247905 (Year: 2021).*
(Continued)

*Primary Examiner* — Steven D Maki
(74) *Attorney, Agent, or Firm* — Thorpe North & Western

(57) ABSTRACT

A pneumatic tire is provided in which each of sipes has a leading-side edge and a trailing-side edge. A chamfered portion that is shorter than a sipe length of the sipe is formed on each of the leading-side edge and the trailing-side edge. The sipe includes, at sections facing the chamfered portions, non-chamfered regions in which other chamfered portions are not present. Both end portions of the sipe are terminated inside a rib. A maximum depth x (mm) of the sipe 11 and a maximum depth y (mm) of the chamfered portion 12 satisfy a relationship x×0.1≤y≤x×0.3+1.0. A sipe width of the sipe is constant in a region between an end portion of the chamfered portion positioned on an inner side in the tire radial direction and a groove bottom of the sipe.

18 Claims, 8 Drawing Sheets

(52) U.S. Cl.
CPC ... *B60C 11/1392* (2013.01); *B60C 2011/1209* (2013.01); *B60C 2011/1213* (2013.01); *B60C 2011/1254* (2013.01)

(56) References Cited

U.S. PATENT DOCUMENTS

| | | |
|---|---|---|
| 2013/0206298 A1 | 8/2013 | Guillermou et al. |
| 2014/0224395 A1* | 8/2014 | Kawakami ............ B60C 11/032 152/209.18 |
| 2015/0210121 A1 | 7/2015 | Sanae |
| 2016/0297254 A1 | 10/2016 | Numata |

FOREIGN PATENT DOCUMENTS

| | | |
|---|---|---|
| EP | 847878 A2 * | 6/1998 |
| JP | 62-247905 A * | 10/1987 |
| JP | 2013-035345 | 2/2013 |
| JP | 2013-537134 | 9/2013 |
| JP | 2015-047977 | 3/2015 |
| JP | 2015-140047 | 8/2015 |
| JP | 2015-231812 | 12/2015 |
| JP | 2016-088165 | 5/2016 |
| WO | WO 2012/032144 | 3/2012 |
| WO | WO 2014/056651 | 4/2014 |
| WO | WO 2015/083474 | 6/2015 |

OTHER PUBLICATIONS

Machine translation for Europe 847878 (Year: 2021).*
International Search Report for International Application No. PCT/JP2017/005361 dated Apr. 4, 2017, 4 pages, Japan.

* cited by examiner

PNEUMATIC TIRE

TECHNICAL FIELD

The present technology relates to a pneumatic tire, and more specifically, to a pneumatic tire in which the steering stability performance on dry road surfaces and the steering stability performance on wet road surfaces can both be improved by modifying the shape of chamfers on sipes.

BACKGROUND ART

Conventionally, in a tread pattern of a pneumatic tire, a plurality of sipes is formed in a rib that is defined by a plurality of main grooves. By providing such sipes in the tread pattern, drainage properties are secured, thereby realizing a good steering stability performance on wet road surfaces. However, when a large number of the sipes are arranged in a tread portion in order to improve the steering stability performance on the wet road surfaces, the rigidity of the rib decreases, and this results in disadvantages, such as a deterioration in the steering stability performance on dry road surfaces or in an uneven wear resistance performance.

Further, various pneumatic tires have been proposed in which sipes are formed in a tread pattern, and chamfering is carried out on those sipes (see Unexamined Japanese Patent Publication No. 2013-537134, for example). When the sipes are formed and the chamfering is carried out on those sipes, an edge effect may be lost depending on the shape of the chamfers, and further, depending on dimensions of the chamfers, an improvement in the steering stability performance on the dry road surfaces or the steering stability performance on the wet road surfaces may become insufficient.

SUMMARY

The present technology provides a pneumatic tire in which the steering stability performance on dry road surfaces and the steering stability performance on wet road surfaces can both be improved by modifying the shape of chamfers on sipes.

A pneumatic tire of the present technology includes a plurality of main grooves extending in a tire circumferential direction in a tread portion and a sipe extending in a tire lateral direction in a rib defined by the plurality of main grooves. The sipe includes a leading-side edge and a trailing-side edge. A chamfered portion that is shorter than a sipe length of the sipe is formed on each of the leading-side edge and the trailing-side edge, and both end portions of the sipe are terminated inside the rib. The sipe further includes, at a section facing the chamfered portion, a non-chamfered region in which another chamfered portion is not present. A maximum depth x (mm) of the sipe and a maximum depth y (mm) of the chamfered portion satisfy a relationship of Formula (1) below, and a sipe width of the sipe is constant in a range between an end portion of the chamfered portion positioned on an inner side in a tire radial direction and a groove bottom of the sipe; $x \times 0.1 \leq y \leq x \times 0.3 + 1.0$ (1).

In the present technology, in the pneumatic tire provided with the sipe extending in the tire lateral direction in the rib defined by the main grooves, by providing the chamfered portion, which is shorter than the sipe length of the sipe, on each of the leading-side edge and the trailing-side edge of the sipe, and also by providing the non-chamfered region, in which another chamfered portion is not present, in each of the sections facing the chamfered portions, a drainage effect can be improved due to the chamfered portions, and at the same time, a water membrane can be effectively removed in the non-chamfered regions due to an edge effect. Thus, the steering stability on the wet road surfaces can be significantly improved. In addition, since the chamfered portion and the non-chamfered region are provided in a mixed manner on each of the leading-side edge and the trailing-side edge, the above-described improvement effect on the wet performance can be obtained to the maximum extent both at the time of braking and driving. Further, compared with a conventional sipe on which chamfering is carried out, an area on which the chamfering is carried out can be minimized, thereby allowing the steering stability performance on the dry road surfaces to be improved. As a result, the steering stability performance on the dry road surfaces and the steering stability performance on the wet road surfaces can both be improved. Particularly, as both the end portions of the sipe are terminated inside the rib, compared with a case in which both the end portions of the sipe or one of the end portions of the sipe is communicated with the main groove, a decrease in the block rigidity can be suppressed, and the steering stability performance on the dry road surfaces can thus be further improved.

In the present technology, the sipe length of the sipe is preferably from 45% to 90% of a rib width of the rib. In this way, by setting the sipe length to be an appropriate length with respect to the rib width, the steering stability performance on the dry road surfaces and the steering stability performance on the wet road surfaces can both be improved. The sipe length is more preferably from 60% to 70% of the rib width.

In the present technology, it is preferable that a mounting direction of the pneumatic tire with respect to a vehicle be designated, and a distance D that is a distance in the tire lateral direction from the end portion positioned on a vehicle outer side, of both the end portions of the sipe, to the main groove, and a distance D' that is a distance in the tire lateral direction from the end portion positioned on a vehicle inner side, of both the end portions of the sipe, to the main groove, have a relationship of D>D'. Thus, the steering stability on the dry road surfaces can be improved. A ratio between D and D', that is, a ratio D/D', is more preferably from 1.1 to 2.0.

In the present technology, the sipe is preferably inclined with respect to the tire circumferential direction. By causing the sipe to be inclined in this way, pattern rigidity can be improved, thereby allowing the steering stability performance on the dry road surfaces to be further improved.

In the present technology, an acute angle-side inclination angle of the sipe with respect to the tire circumferential direction is preferably from 40° to 80°. By setting the acute angle-side inclination angle of the sipe with respect to the tire circumferential direction in this way, the steering stability performance on the dry road surfaces can be effectively improved. The acute angle-side inclination angle is more preferably from 50° to 70°.

In the present technology, the chamfered portion is preferably arranged on an acute angle side of the sipe. In this way, an uneven wear resistance performance can be further improved. Alternatively, the chamfered portion is preferably arranged on an obtuse angle side of the sipe. In this way, the edge effect is enhanced, and the steering stability performance on the wet road surfaces can thus be further improved.

In the present technology, at least a part of the sipe is preferably curved or bent in a plan view. By forming at least a part of the sipe in this way, a total volume of the edges of each of the sipes increases, and the steering stability performance on the wet road surfaces can thus be improved. The entire sipe may be formed in an arc-shape.

In the present technology, an overlap length, over which the chamfered portion formed on the leading-side edge of the sipe and the chamfered portion formed on the trailing-side edge of the sipe overlap each other, is preferably from −30% to 30% of the sipe length. In this way, by setting the overlap length of the chamfered portions to be an appropriate length with respect to the sipe length, the steering stability performance on the dry road surfaces and the steering stability performance on the wet road surfaces can both be improved. The overlap length is more preferably from −15% to 15% of the sipe length.

In the present technology, each of the chamfered portions is preferably arranged at one location on each of the leading-side edge and the trailing-side edge of the sipe. By arranging the chamfered portions in this way, the uneven wear resistance performance can be improved.

In the present technology, a maximum width of the chamfered portion is preferably from 0.8 to 5.0 times larger than the sipe width of the sipe. In this way, by setting the maximum width of the chamfered portion to be an appropriate width with respect to the sipe width, the steering stability performance on the dry road surfaces and the steering stability performance on the wet road surfaces can both be improved. The maximum width of the chamfered portion is more preferably from 1.2 to 3.0 times greater than the sipe width.

In the present technology, the chamfered portion preferably extends in parallel with the sipe. As a result, the uneven wear resistance performance can be improved, and at the same time, the steering stability performance on the dry road surfaces and the steering stability performance on the wet road surfaces can both be improved.

BRIEF DESCRIPTION OF DRAWINGS

FIGS. 7A and 7B are plan views of the respective modified examples.

FIGS. 8A to 8E are plan views of the respective modified examples.

DETAILED DESCRIPTION

A configuration of the present technology will be described below in detail with reference to the appended drawings. Note that CL is a center line of a tire in FIG. 1.

Figure 1:
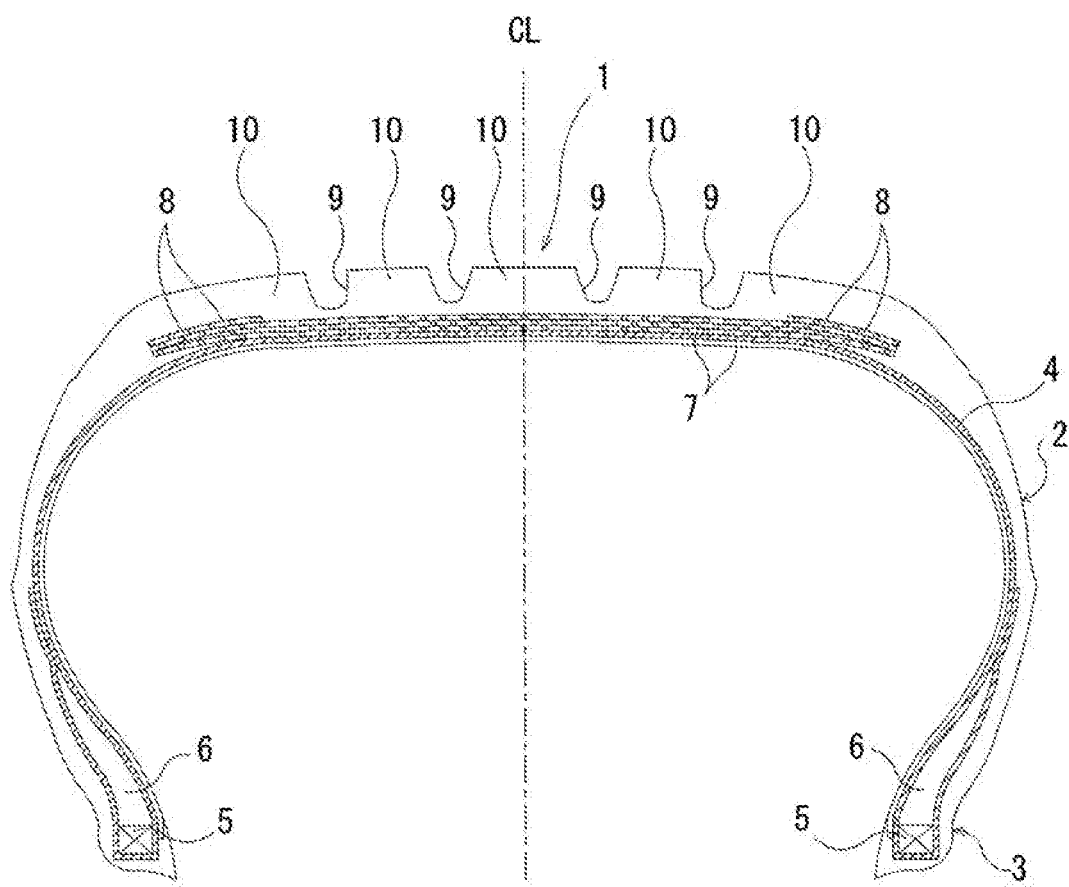
FIG. 1 is a meridian cross-sectional view illustrating a pneumatic tire according to an embodiment of the present technology.

As illustrated in FIG. 1, a pneumatic tire according to an embodiment of the present technology includes an annular-shaped tread portion 1 extending in the tire circumferential direction, a pair of sidewall portions 2 disposed on both sides of the tread portion 1, and a pair of bead portions 3 disposed on an inner side of the sidewall portions 2 in the tire radial direction.

A carcass layer 4 is mounted between the pair of bead portions 3. The carcass layer 4 includes a plurality of reinforcing cords extending in the tire radial direction and is folded back around bead cores 5, disposed in each of the bead portions 3, from a tire inner side to a tire outer side. A bead filler 6, which has a triangular cross-sectional shape and is formed from a rubber composition, is disposed on an outer circumference of the bead core 5.

Meanwhile, a plurality of belt layers 7 are embedded on an outer circumferential side of the carcass layer 4 in the tread portion 1. These belt layers 7 include a plurality of reinforcing cords that are inclined with respect to the tire circumferential direction, and disposed so that directions of the reinforcing cords of different layers intersect each other. In the belt layers 7, an inclination angle of the reinforcing cords, with respect to the tire circumferential direction, ranges from 10° to 40°, for example. Steel cords are preferably used as the reinforcing cords of the belt layers 7. For the purpose of improving high-speed durability, at least one layer of a belt cover layer 8, which is formed by arranging the reinforcing cords at an angle of 5° or less with respect to the tire circumferential direction, for example, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction is formed in the tread portion 1, and a plurality of ribs 10 is defined by the main grooves 9 in the tread portion 1.

Note that the above-described tire internal structure is a representative example of an internal structure of a pneumatic tire, but the present technology is not limited to this example.

Figure 2:
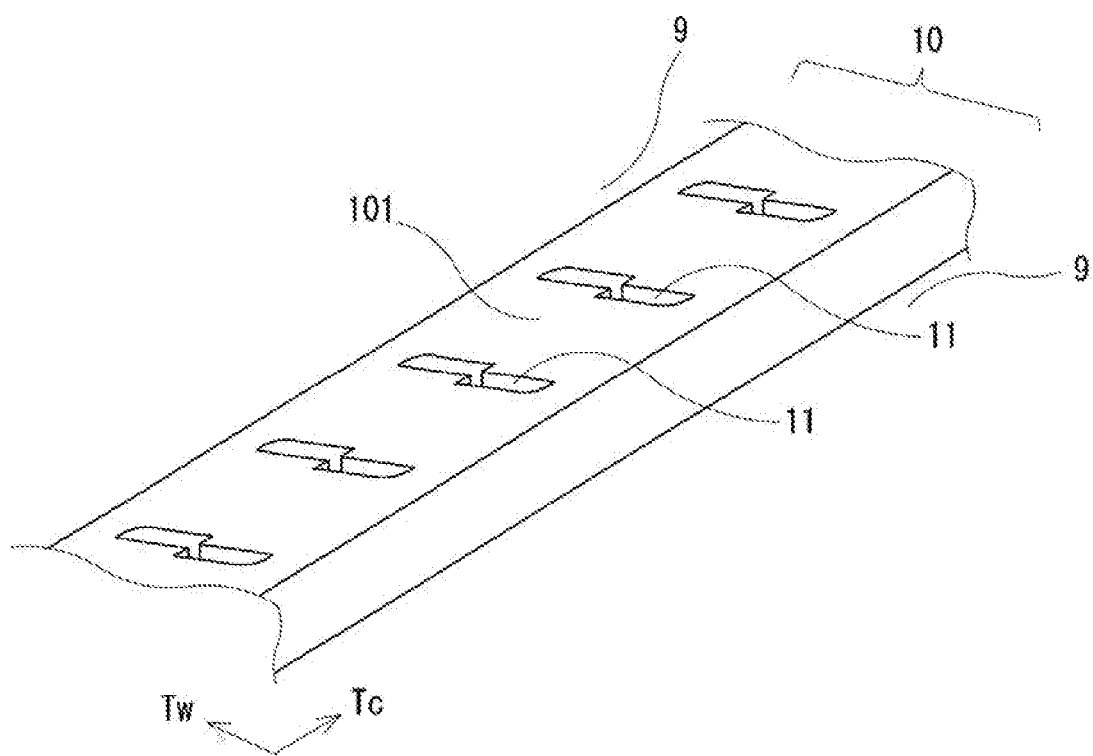
FIG. 2 is a perspective view illustrating a part of a tread portion of the pneumatic tire according to the present technology.

FIG. 2 is a perspective view illustrating a part of the tread portion 1, and in FIG. 2, Tc is the tire circumferential direction, and Tw is the tire lateral direction. As illustrated in FIG. 2, the rib 10 includes a plurality of sipes 11 extending in the tire lateral direction and blocks 101 that are defined by the plurality of sipes 11. The plurality of blocks 101 is arranged side by side in the tire circumferential direction. The sipe 11 is a narrow groove whose groove width is 1.5 mm or less.

Figure 3:
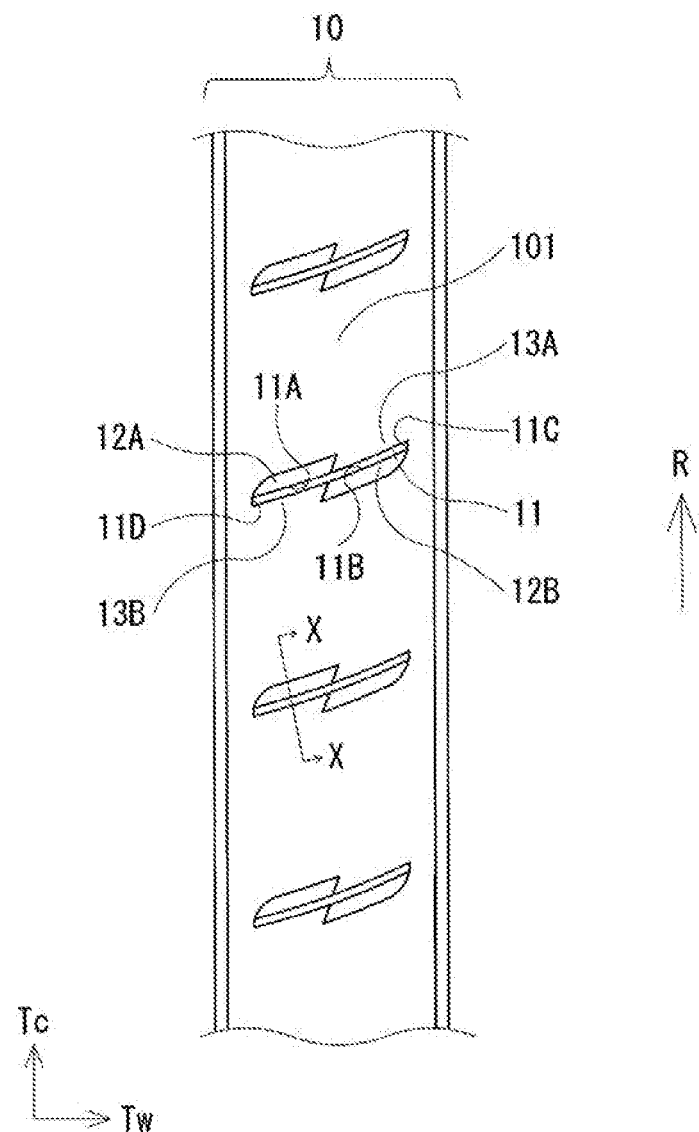
FIG. 3 is a plan view illustrating a part of a tread portion of a pneumatic tire according to the present technology.

As illustrated in FIG. 3, the sipe 11 includes end portions 11C and 11D, and is a closed sipe in which neither of the end portions 11C nor 11D is communicated with the main grooves 9 positioned on both sides of the rib 10. In other words, both the end portions 11C and 11D of the sipe 11 are terminated inside the rib 10. As a result of the sipe 11 being formed in this way, compared with a case in which both the end portions of the sipe or one of the end portions of the sipe is communicated with the main groove, a decrease in block rigidity can be suppressed, and the steering stability performance on dry road surfaces can thus be improved.

Further, an overall shape of the sipe 11 has a curved shape, and the sipes 11 are formed inside the rib 10 at intervals in the tire circumferential direction. Furthermore, the sipe 11 includes an edge 11A that is on a leading side with respect to a rotation direction R and an edge 11B that is on a trailing side with respect to the rotation direction R. A chamfered portion 12 is formed on each of the leading-side edge 11A and the trailing-side edge 11B.

The chamfered portion 12 includes a chamfered portion 12A that is on the leading side with respect to the rotation direction R and a chamfered portion 12B that is on the trailing side with respect to the rotation direction R. Non-chamfered regions 13, in which other chamfered portions are not present, are provided in sections facing the chamfered portions 12. In other words, a non-chamfered region 13B that is on the trailing side with respect to the rotation direction R is provided in a section facing the chamfered portion 12A, and a non-chamfered region 13A that is on the leading side with respect to the rotation direction R is provided in a section facing the chamfered portion 12B. In this way, the chamfered portions 12 and the non-chamfered regions 13, in which other chamfered portions are not present, are arranged so as to be adjacent to each of the leading-side edge 11A and the trailing-side edge 11B of the sipe 11.

Figure 4:
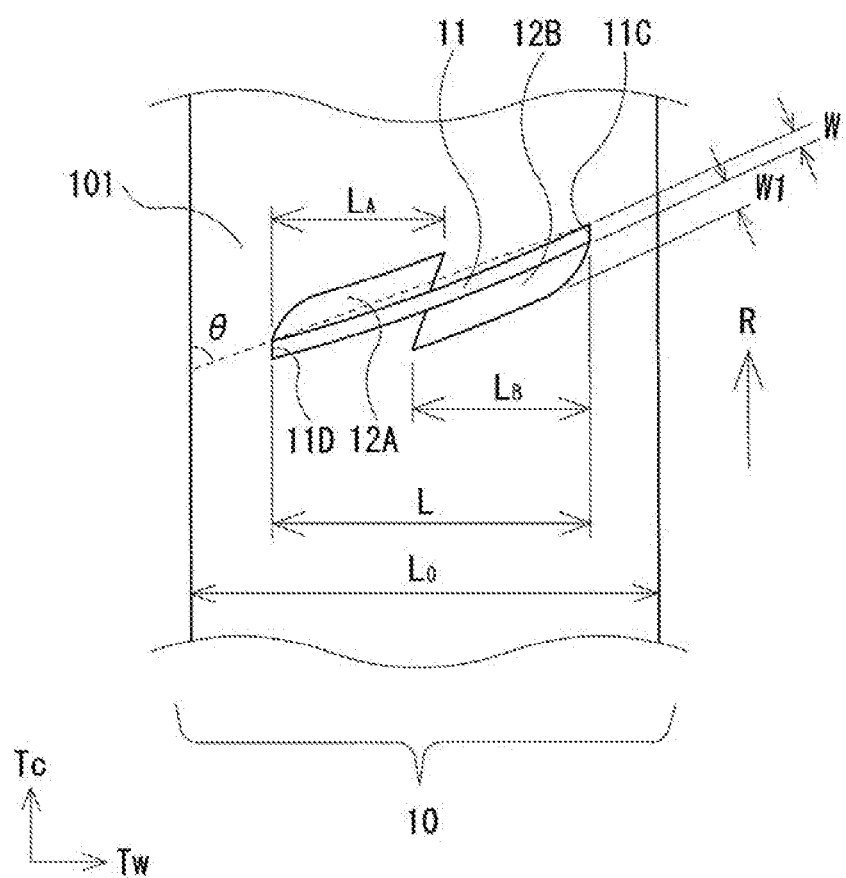
FIG. 4 is a plan view illustrating a sipe formed in the tread portion in FIG. 3 and chamfered portions of the sipe.

As illustrated in FIG. 4, lengths of the sipe 11 and the chamfered portions 12A and 12B in the tire lateral direction are respectively denoted as a sipe length L and chamfer lengths $L_A$ and $L_B$. The sipe length L and the chamfer lengths $L_A$ and $L_B$ are respectively the lengths of the sipe 11 and the chamfered portions 12A and 12B, in the tire lateral direction, from one end portion to the other end portion thereof. Both the chamfer lengths $L_A$ and $L_B$ of the chamfered portions 12A and 12B are formed to be shorter than the sipe length L of the sipe 11.

Figure 5:
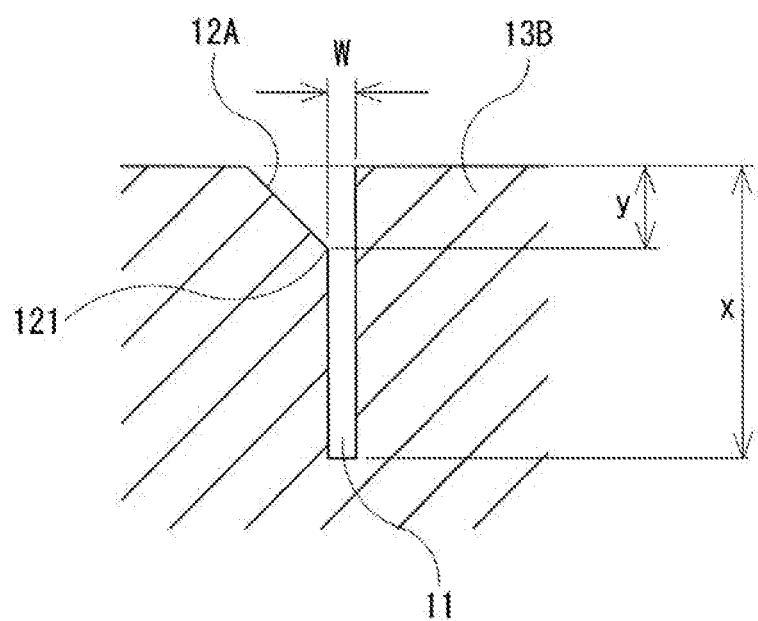
FIG. 5 is a cross-sectional view along a line X-X in FIG. 3.

FIG. 5 is a cross-sectional view orthogonal to the sipe 11, in which the tread portion 1 is cut out in the vertical direction. As illustrated in FIG. 5, when a maximum depth of the sipe 11 is x (mm) and a maximum depth of the chamfered portion 12 is y (mm), the sipe 11 and the chamfered portion 12 are formed such that the maximum depth x (mm) and the maximum depth y (mm) satisfy a relationship of Formula (1) described below. The maximum depth x of the sipe 11 is preferably from 3 mm to 8 mm. A sipe width W of the sipe 11 is substantially constant in a region from an end portion 121, of the chamfered portion 12, positioned on an inner side in the tire radial direction, to a groove bottom of the sipe 11. This sipe width W is a width of the sipe 11, which is substantially measured in the following manner. For example, when a protrusion is provided on a groove wall of the sipe 11, the sipe width W is measured without including a height of the protrusion in the sipe width, or when the sipe width of the sipe 11 is gradually narrowed toward the groove bottom, the sipe width W is measured without including a narrowed section in the sipe width.

$$x \times 0.1 \leq y \leq x \times 0.3 + 1.0 \quad (1)$$

In the above-described pneumatic tire, by providing the chamfered portion 12, which is shorter than the sipe length L of the sipe 11, on each of the leading-side edge 11A and the trailing-side edge 11B of the sipe 11, and by providing the non-chamfered region 13, in which another chamfered portion is not present, in each of the sections facing the chamfered portions 12, a drainage effect can be improved due to the chamfered portions 12, and at the same time, a water membrane can be effectively removed in the non-chamfered regions 13, in which the chamfered portions 12 are not provided, due to an edge effect. Thus, the steering stability performance on wet road surfaces can be significantly improved. In addition, since the chamfered portion 12 and the non-chamfered region 13, in which no chamfered portions are present, are provided in a mixed manner on each of the leading-side edge 11A and the trailing-side edge 11B, the above-described improvement effect on the wet performance can be obtained to the maximum extent both at the time of braking and driving. Particularly, as both the end portions 11C and 11D of the sipe 11 are terminated inside the rib 10, compared with a case in which both the end portions of the sipe or one of the end portions of the sipe is communicated with the main groove, the decrease in the block rigidity can be suppressed, and the steering stability performance on the dry road surfaces can thus be further improved.

Furthermore, in the above-described pneumatic tire, the maximum depth x (mm) and the maximum depth y (mm) need to satisfy the relationship of Formula (1) described above. By providing the sipe 11 and the chamfered portion 12 so as to satisfy the relationship of the above-described Formula (1), compared with a conventional sipe on which chamfering is carried out, an area on which the chamfering is carried out can be minimized, thereby allowing the steering stability performance on the dry road surfaces to be improved. As a result, the steering stability performance on the dry road surfaces and the steering stability performance on the wet road surfaces can both be improved. Here, when $y < x \times 0.1$, the drainage effect due to the chamfered portions 12 becomes insufficient, and when $y > x \times 0.3 + 1.0$, the steering stability performance on the dry road surfaces deteriorates due to a decrease in the rigidity of the ribs 10. Particularly, it is favorable to satisfy the relationship of $y \leq x \times 0.3 + 0.5$.

As illustrated in FIG. 4, the rib 10 has a constant width in the tire lateral direction, and the width of the rib 10 is denoted as a width $L_0$. At this time, the sipe length L of the sipe 11 is preferably from 45% to 90% of the rib width $L_0$ of the rib 10, and more preferably from 60% to 70% thereof. In this way, by setting the sipe length L of the sipe 11 to be an appropriate length with respect to the rib width $L_0$, the steering stability performance on the dry road surfaces and the steering stability performance on the wet road surfaces can both be improved. Here, when the sipe length L of the sipe 11 is less than 45% of the rib width $L_0$ of the rib 10, the improvement in the steering stability performance on the wet road surfaces becomes insufficient, and on the other hand, when the sipe length L of the sipe 11 exceeds 90% of the rib width $L_0$ of the rib 10, the improvement in the steering stability performance on the dry road surfaces becomes insufficient.

As illustrated in FIG. 4, the sipe 11 is formed so as to have an inclination angle θ with respect to the tire circumferential direction. This inclination angle θ is an angle formed by an imaginary line (a dotted line in FIG. 4) that connects both the end portions 11C and 11D of the sipe 11 and a side surface of the block 101. The inclination angle θ may be an acute angle-side inclination angle or an obtuse angle-side inclination angle, and FIG. 4 illustrates the acute angle-side inclination angle θ. Further, the inclination angle θ indicates an inclination angle of the sipe 11 in an intermediate pitch inside the rib 10. At this time, the acute angle-side inclination angle θ is preferably from 40° to 80°, and more preferably from 50° to 70°. In this way, by causing the sipe 11 to be inclined with respect to the tire circumferential direction, pattern rigidity can be improved, thereby allowing the steering stability performance on the dry road surfaces to be further improved. Here, when the inclination angle θ is smaller than 40°, the uneven wear resistance performance deteriorates, and when the inclination angle θ exceeds 80°, the pattern rigidity cannot be improved sufficiently.

In the present technology, a side on which the acute angle-side inclination angle θ of the sipe 11 is positioned is referred to as an acute angle side, and a side on which the obtuse angle-side inclination angle θ of the sipe 11 is positioned is referred to as an obtuse angle side. The chamfered portions 12A and 12B, which are respectively formed in the edges 11A and 11B of the sipe 11, are formed on the acute angle side of the sipe 11. In this way, by carrying out the chamfering on the acute angle side of the sipe 11, the uneven wear resistance performance can be further improved. Alternatively, the chamfered portions 12A and 12B may be formed on the obtuse angle side of the sipe 11. In this way, by forming the chamfered portions 12A and 12B on the obtuse angle side of the sipe 11, the edge effect is enhanced, and the steering stability performance on the wet road surfaces can thus be further improved.

In the present technology, as a result of the overall shape of the above-described sipe 11 having the curved shape, the steering stability performance on the wet road surfaces can be improved. In other words, a part of the sipe 11 may have a curved or bent shape in a plan view. By forming the sipe 11 in this way, a total volume of the edges 11A and 11B of each of the sipes 11 increases, and the steering stability performance on the wet road surfaces can thus be improved.

As illustrated in FIG. 3, each of the chamfered portions 12 is arranged at the one location on each of the leading-side edge 11A and the trailing-side edge 11B of the sipe 11. By arranging the chamfered portions 12 in this way, the uneven wear resistance performance can be improved. Here, when the chamfered portions 12 are formed at two or more locations on each of the leading-side edge 11A and the trailing-side edge 11B of the sipe 11, the number of nodes increases, and this tends to cause the uneven wear resistance performance to deteriorate.

Further, a maximum value of the width of the chamfered portion 12, which is measured along a direction orthogonal to the sipe 11, is denoted as a width W1. At this time, the maximum width W1 of the chamfered portion 12 is preferably 0.8 to 5.0 times larger than the sipe width W of the sipe 11, and more preferably 1.2 to 3.0 times larger than the sipe width W of the sipe 11. In this way, by setting the maximum width W1 of the chamfered portion 12 to be an appropriate width with respect to the sipe width W, the steering stability performance on the dry road surfaces and the steering stability performance on the wet road surfaces can both be improved. Here, when the maximum width W1 of the chamfered portion 12 is less than 0.8 times the sipe width W of the sipe 11, the improvement on the steering stability performance on the wet road surfaces becomes insufficient, and when it is greater than 5.0 times the sipe width W of the sipe 11, the improvement on the steering stability performance on the dry road surfaces becomes insufficient.

Further, an outer edge portion in the longitudinal direction of the chamfered portion 12 is formed to be in parallel with an extension direction of the sipe 11. In this way, as a result of the chamfered portions 12 extending in parallel with the sipe 11, the uneven wear resistance performance can be improved, and at the same time, the steering stability performance on the dry road surfaces and the steering stability performance on the wet road surfaces can both be improved.

Figure 7A:
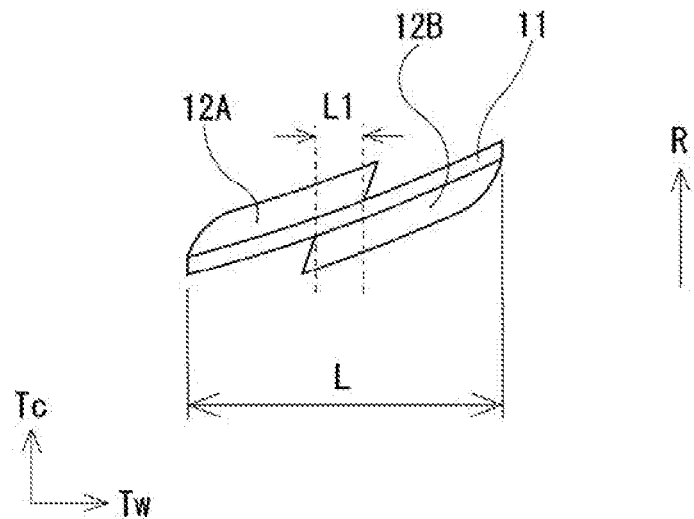
FIGS. 7A and 7B illustrate other modified examples of the sipe of the pneumatic tire according to the present technology and of the chamfered portions of the sipe.
Figure 7B:
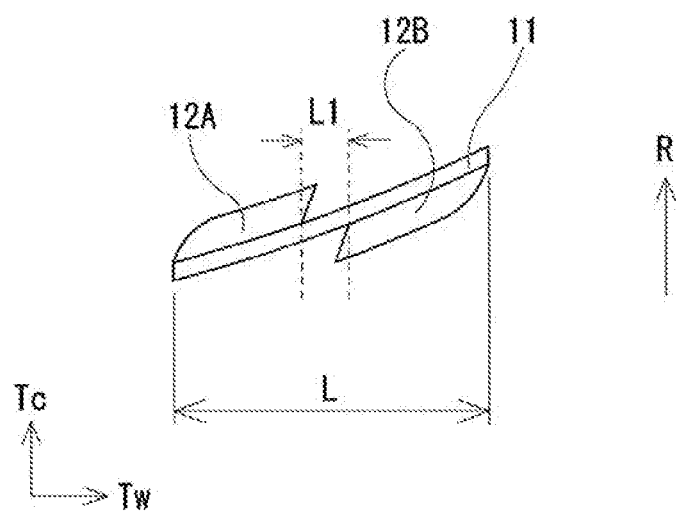

As illustrated in FIG. 7A, the chamfered portion 12A and the chamfered portion 12B are formed such that a part of the chamfered portion 12A and a part of the chamfered portion 12B overlap each other over a central portion of the sipe 11. Here, a length in the tire lateral direction of an overlapping portion, which is a section in which the chamfered portion 12A and the chamfered portion 12B overlap each other, is denoted as an overlap length L1. Meanwhile, as illustrated in FIG. 7B, when a part of the chamfered portion 12A and a part of the chamfered portion 12B do not overlap each other and are separated from each other by a certain gap therebetween, a ratio of the overlap length L1 to the sipe length L indicates a negative value. The overlap length L1 of the overlapping portion is preferably from −30% to 30% of the sipe length L, and more preferably from −15% to 15% of the sipe length L. In this way, by setting the overlap length L1 of the chamfered portions 12A and 12b to be an appropriate length with respect to the sipe length L, the steering stability performance on the dry road surfaces and the steering stability performance on the wet road surfaces can both be improved. Here, when the overlap length L1 is greater than 30% of the sipe length L, the improvement in the steering stability performance on the dry road surfaces becomes insufficient, and when the overlap length L1 is less than −30% of the sipe length L, the improvement in the steering stability performance on the wet road surfaces becomes insufficient.

Figure 6:
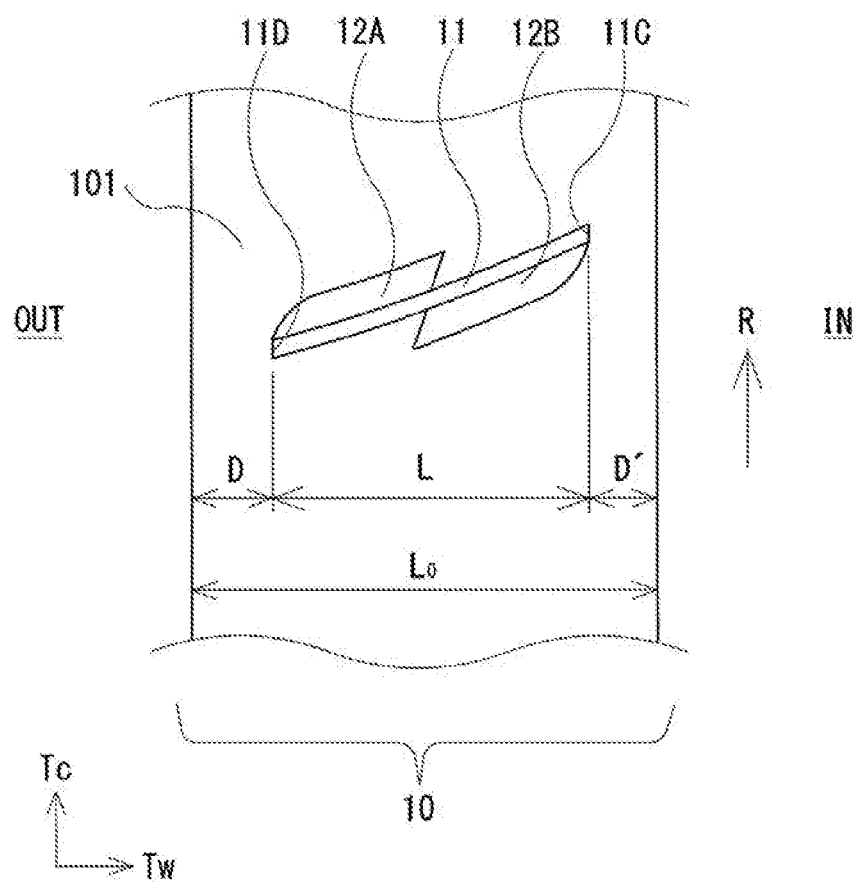
FIG. 6 is a plan view illustrating a modified example of the sipe formed in the tread portion of the present technology and of the chamfered portions of the sipe.

FIG. 6 is a plan view illustrating a modified example of the sipe 11 that is formed in the tread portion 1 and the chamfered portions 12A and 12B thereof, and IN indicates a vehicle inner side, and OUT indicates a vehicle outer side. A mounting direction, with respect to a vehicle, of a pneumatic tire illustrated in FIG. 6 is designated. Of both the end portions 11C and 11D of the sipe 11, a distance in the tire lateral direction from the end portion 11D, positioned on the vehicle outer side, to the main groove 9, is denoted as a distance D, and a distance in the tire lateral direction from the end portion 11C, positioned on the vehicle inner side, to the main groove 9, is denoted as a distance D'. In the pneumatic tire whose mounting direction with respect to the vehicle is designated, the distance D and the distance D' satisfy a relationship of D>D'. In other words, the sipe 11 is arranged so as to be closer to the vehicle inner-side main groove 9, with respect to a center line of the rib 10 in the tire circumferential direction. A ratio between D and D', that is, a ratio D/D', is more preferably from 1.1 to 2.0. By arranging the sipe 11 in this way, the steering stability performance on the dry road surfaces can be improved.

Figure 8A:
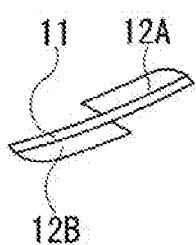
FIGS. 8A to 8E illustrate other modified examples of the sipe of the pneumatic tire according to the present technology and of the chamfered portions of the sipe.
Figure 8B:
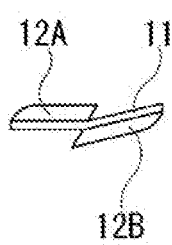
Figure 8C:
Figure 8D:
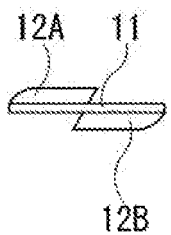
Figure 8E:
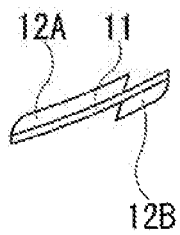

As the chamfered portions 12A and 12B of the sipe 11, in addition to those illustrated in FIGS. 2 to 4, FIG. 6, and FIGS. 7A and 7B, other examples can be illustrated, such as a case in which the chamfering is carried out on the obtuse angle side of the sipe 11, illustrated in FIG. 8A, a case in which a part of the sipe 11 is bent, as illustrated in FIG. 8B, and a case in which the end portion of each of the chamfered portions 12A and 12B positioned closer to the main groove 9 is not open to the main groove 9, but is terminated inside the rib 10, as illustrated in FIG. 8C. Further examples that can be illustrated include a case in which the sipe 11 and the chamfered portions 12A and 12B are formed to be in parallel with each other in the tire lateral direction, as illustrated in FIG. 8D, and a case in which a boundary line, in the tire lateral direction, between the chamfered portion 12A and the chamfered portion 12B is significantly displaced from the center of the sipe 11, as illustrated in FIG. 8E.

EXAMPLES

Conventional Examples 1 and 2, Comparative Examples 1 and 2, and Examples 1 to 12 were each produced of a pneumatic tire that has a tire size of 245/40R19, and which includes the plurality of main grooves extending in the tire circumferential direction in the tread portion and the sipes extending in the tire lateral direction in the ribs defined by the plurality of main grooves. At that time, the arrangement of the chamfered portions (both sides or one side), a relative length of the sipe length L with respect to the chamfer lengths $L_A$ and $L_B$, the presence/absence of the sections facing the chamfered portions, the maximum width x (mm) of the sipe, the maximum width y (mm) of the chamfered portion, the ratio of the sipe length L to the rib width $L_0$, the distance between the end portion of the sipe and the main groove (distances of D and D'), the acute angle-side inclination angle of the sipe with respect to the tire circumferential direction, positions of the chamfers of the sipe (the acute angle side or the obtuse angle side), the overall shape of the sipe (straight line or curved), the ratio of the overlap length L1 to the sipe length L, the number of chamfered positions (one position or two positions), the maximum width W1 of the chamfered portion with respect to the sipe width W (W1/W), and the shape of the chamfers (parallel or not parallel) were set as shown in Table 1 and Table 2.

With respect to those test tires, sensory evaluation was conducted by a test driver on the steering stability performance on the dry road surfaces and the steering stability performance on the wet road surfaces, and visual evaluation was conducted on the uneven wear resistance performance. The results thereof are shown in Table 1 and Table 2.

Note that a configuration of the sipe adopted in all of the test tires was a closed sipe in which both the end portions of the sipe were not communicated with the main groove, but terminated inside the rib. Furthermore, in the tires used in Conventional Example 1, Comparative Examples 1 and 2, and Examples 1 to 12, the sipe width was constant in the region from the end portion of the chamfered portion, which was positioned on the inner side in the tire radial direction, to the groove bottom of the sipe.

In the sensory evaluation of the steering stability performance on the dry road surfaces and the steering stability performance on the wet road surfaces, each of the test tires was assembled on a wheel having a rim size of 19×8.5 J, inflated to an air pressure of 260 kPa, and mounted on a test vehicle. Evaluation results were expressed as index values while assigning an index value of 100 to Conventional Example 1. Larger index values indicate superior steering stability performance on the dry road surfaces and superior steering stability on the wet road surfaces.

In the visual evaluation of the uneven wear resistance performance, each of the test tires was assembled on a wheel having a rim size of 19×8.5 J, inflated to an air pressure of 260 kPa, and mounted on a test vehicle. Then, under those conditions, after each of the test tires was driven for 4,000 km, an appearance of the tire was visually evaluated. Evaluation results were expressed as index values while assigning an index value of 100 to Conventional Example 1. Larger index values indicate a superior uneven wear resistance performance.

TABLE 1

|  | Conventional Example 1 | Conventional Example 2 | Comparative Example 1 | Comparative Example 2 |
|---|---|---|---|---|
| Arrangement of chamfered portions (both sides or one side) | Both sides | One side | Both sides | Both sides |
| Relative length of sipe length L to chamfer lengths $L_A$ and $L_B$ | $L = L_A, L_B$ | $L = L_A$ | $L > L_A, L_B$ | $L > L_A, L_B$ |
| Presence/absence of sections facing chamfered portions | Present | Absent | Absent | Absent |
| Maximum depth x (mm) of sipe | 5 mm | 5 mm | 5 mm | 5 mm |
| Maximum depth y (mm) of chamfered portion | 2 mm | 5 mm | 0.3 mm | 3 mm |
| Ratio of sipe length L to rib width $L_0$ | 95% | 95% | 95% | 95% |
| Distance between end portion of sipe and main groove (distances of D and D') | D = D' | D = D' | D = D' | D = D' |
| Acute angle-side inclination angle of sipe with respect to tire circumferential direction | 90° | 90° | 90° | 90° |
| Positions of chamfers of sipe (obtuse angle side or acute angle side) | Obtuse angle side | Obtuse angle side | Obtuse angle side | Obtuse angle side |
| Overall shape of sipe (straight line or curved) | Straight line | Straight line | Straight line | Straight line |
| Ratio of overlap length L1 of chamfered portion to sipe length L | — | — | 0% | 0% |
| Number of chamfered positions (one position or two positions) | One position | One position | One position | One position |
| Maximum width W1 of chamfered portion with respect to sipe width W (W1/W) | 0.5 times | 0.5 times | 0.5 times | 0.5 times |
| Shape of chamfers (parallel or not parallel) | Parallel | Parallel | Parallel | Parallel |
| Steering stability performance on dry road surfaces | 100 | 90 | 105 | 99 |
| Steering stability performance on wet road surfaces | 100 | 105 | 98 | 103 |
| Uneven wear resistance performance | 100 | 100 | 100 | 100 |

|  | Example 1 | Example 2 | Example 3 | Example 4 |
|---|---|---|---|---|
| Arrangement of chamfered portions (both sides or one side) | Both sides | Both sides | Both sides | Both sides |
| Relative length of sipe length L to chamfer lengths $L_A$ and $L_B$ | $L > L_A, L_B$ | $L > L_A, L_B$ | $L > L_A, L_B$ | $L > L_A, L_B$ |

TABLE 1-continued

|  |  |  |  |  |
|---|---|---|---|---|
| Presence/absence of sections facing chamfered portions | Absent | Absent | Absent | Absent |
| Maximum depth x (mm) of sipe | 5 mm | 5 mm | 5 mm | 5 mm |
| Maximum depth y (mm) of chamfered portion | 2 mm | 2 mm | 2 mm | 2 mm |
| Ratio of sipe length L to rib width $L_0$ | 95% | 60% | 60% | 60% |
| Distance between end portion of sipe and main groove (distances of D and D') | D = D' | D = D' | D > D' | D > D' |
| Acute angle-side inclination angle of sipe with respect to tire circumferential direction | 90° | 90° | 90° | 85° |
| Positions of chamfers of sipe (obtuse angle side or acute angle side) | Obtuse angle side | Obtuse angle side | Obtuse angle side | Obtuse angle side |
| Overall shape of sipe (straight line or curved) | Straight line | Straight line | Straight line | Straight line |
| Ratio of overlap length L1 of chamfered portion to sipe length L | 0% | 0% | 0% | 0% |
| Number of chamfered positions (one position or two positions) | One position | One position | One position | One position |
| Maximum width W1 of chamfered portion with respect to sipe width W (W1/W) | 0.5 times | 0.5 times | 0.5 times | 0.5 times |
| Shape of chamfers (parallel or not parallel) | Parallel | Parallel | Parallel | Parallel |
| Steering stability performance on dry road surfaces | 105 | 107 | 109 | 110 |
| Steering stability performance on wet road surfaces | 103 | 103 | 103 | 103 |
| Uneven wear resistance performance | 100 | 100 | 100 | 100 |

TABLE 2

|  | Example 5 | Example 6 | Example 7 | Example 8 |
|---|---|---|---|---|
| Arrangement of chamfered portions (both sides or one side) | Both sides | Both sides | Both sides | Both sides |
| Relative length of sipe length L to chamfer length $L_A$ and $L_B$ | $L > L_A, L_B$ | $L > L_A, L_B$ | $L > L_A, L_B$ | $L > L_A, L_B$ |
| Presence/absence of sections facing chamfered portions | Absent | Absent | Absent | Absent |
| Maximum depth x (mm) of sipe | 5 mm | 5 mm | 5 mm | 5 mm |
| Maximum depth y (mm) of chamfered portion | 2 mm | 2 mm | 2 mm | 2 mm |
| Ratio of sipe length L to rib width $L_0$ | 60% | 60% | 60% | 60% |
| Distance between end portion of sipe and main groove (distances of D and D') | D > D' | D > D' | D > D' | D > D' |
| Acute angle-side inclination angle of sipe with respect to tire circumferential direction | 60° | 60° | 60° | 60° |
| Positions of chamfers of sipe (obtuse angle side or acute angle side) | Obtuse angle side | Acute angle side | Acute angle side | Acute angle side |
| Overall shape of sipe (straight line or curved) | Straight line | Straight line | Curved | Curved |
| Ratio of overlap length L1 of chamfered portion to sipe length L | 0% | 0% | 0% | 10% |
| Number of chamfered positions (one position or two positions) | One position | One position | One position | One position |
| Maximum width W1 of chamfered portion with respect to sipe width W (W1/W) | 0.5 times | 0.5 times | 0.5 times | 0.5 times |
| Shape of chamfers (parallel or not parallel) | Parallel | Parallel | Parallel | Parallel |
| Steering stability performance on dry road surfaces | 111 | 111 | 111 | 111 |
| Steering stability performance on wet road surfaces | 103 | 102 | 105 | 105 |
| Uneven wear resistance performance | 100 | 103 | 103 | 103 |

|  | Example 9 | Example 10 | Example 11 | Example 12 |
|---|---|---|---|---|
| Arrangement of chamfered portions (both sides or one side) | Both sides | Both sides | Both sides | Both sides |
| Relative length of sipe length L to chamfer length $L_A$ and $L_B$ | $L > L_A, L_B$ | $L > L_A, L_B$ | $L > L_A, L_B$ | $L > L_A, L_B$ |

TABLE 2-continued

| | | | | |
|---|---|---|---|---|
| Presence/absence of sections facing chamfered portions | Absent | Absent | Absent | Absent |
| Maximum depth x (mm) of sipe | 5 mm | 5 mm | 5 mm | 5 mm |
| Maximum depth y (mm) of chamfered portion | 2 mm | 2 mm | 2 mm | 2 mm |
| Ratio of sipe length L to rib width $L_0$ | 60% | 60% | 60% | 60% |
| Distance between end portion of sipe and main groove (distances of D and D') | D > D' | D > D' | D > D' | D > D' |
| Acute angle-side inclination angle of sipe with respect to tire circumferential direction | 60° | 60° | 60° | 60° |
| Positions of chamfers of sipe (obtuse angle side or acute angle side) | Acute angle side | Acute angle side | Acute angle side | Acute angle side |
| Overall shape of sipe (straight line or curved) | Curved | Curved | Curved | Curved |
| Ratio of overlap length L1 of chamfered portion to sipe length L | −10% | 0% | 0% | 0% |
| Number of chamfered positions (one position or two positions) | One position | Two positions | One position | One position |
| Maximum width W1 of chamfered portion with respect to sipe width W (W1/W) | 0.5 times | 0.5 times | 2 times | 2 times |
| Shape of chamfers (parallel or not parallel) | Parallel | Parallel | Parallel | Not parallel |
| Steering stability performance on dry road surfaces | 113 | 111 | 112 | 110 |
| Steering stability performance on wet road surfaces | 103 | 104 | 106 | 104 |
| Uneven wear resistance performance | 103 | 101 | 105 | 104 |

As ascertained from Table 1 and Table 2, by modifying the shape of the chamfered portions formed in the sipe, in each of the tires of Examples 1 to 12, the uneven wear resistance performance was improved, and at the same time, the steering stability performance on the dry road surfaces and the steering stability performance on the wet road surfaces were also improved.

Meanwhile, in Comparative Example 1, since the maximum depth y of the chamfered portions was set to be extremely shallow, the improvement effect on the steering stability performance on the wet road surfaces was not obtained. Furthermore, in Comparative Example 2, since the maximum depth y of the chamfered portions was set to be extremely deep, the improvement effect on the steering stability performance on the dry road surfaces was not obtained.

The invention claimed is:

1. A pneumatic tire, comprising:
a plurality of main grooves extending in a tire circumferential direction in a tread portion; and
a sipe extending in a tire lateral direction in a rib defined by the plurality of main grooves, wherein
the sipe includes a leading-side edge and a trailing-side edge, a chamfered portion that is shorter than a sipe length of the sipe is formed on each of the leading-side edge and the trailing-side edge, the sipe further includes, at a section facing each chamfered portion, a non-chamfered region in which another chamfered portion is not present, both end portions of the sipe are terminated inside the rib, a maximum depth x (mm) of the sipe and a maximum depth y (mm) of each chamfered portion satisfy a relationship $x \times 0.1 \leq y \leq x \times 0.3 + 1.0$, and a sipe width of the sipe is constant in a range between an end portion of each chamfered portion positioned on an inner side in a tire radial direction and a groove bottom of the sipe, the sipe width being 1.5 mm or less, and only a single one of the chamfered portion is formed on each of the leading-side edge and the trailing-side edge.

2. The pneumatic tire according to claim 1, wherein the sipe length of the sipe is from 45% to 90% of a rib width of the rib.

3. The pneumatic tire according to claim 2, wherein a mounting direction of the pneumatic tire with respect to a vehicle is designated, and a distance D that is a distance in the tire lateral direction from the end portion positioned on a vehicle outer side, of both the end portions of the sipe, to the main groove, and a distance D' that is a distance in the tire lateral direction from the end portion positioned on a vehicle inner side, of both the end portions of the sipe, to the main groove, have a relationship of D>D'.

4. The pneumatic tire according to claim 3, wherein the sipe is inclined with respect to the tire circumferential direction.

5. The pneumatic tire according to claim 4, wherein an acute angle-side inclination angle of the sipe with respect to the tire circumferential direction is from 40° to 80°, and each chamfered portion is arranged on an acute angle side of the sipe.

6. The pneumatic tire according to claim 4, wherein an acute angle-side inclination angle of the sipe with respect to the tire circumferential direction is from 40° to 80°, and each chamfered portion is arranged on an obtuse angle side of the sipe.

7. The pneumatic tire according to claim 6, wherein at least a part of the sipe is curved or bent in a plan view, and wherein an overlap length, over which the chamfered portion formed on the leading-side edge of the sipe and the chamfered portion formed on the trailing-side edge of the sipe overlap each other, is from −30% to 30% of the sipe length.

8. The pneumatic tire according to claim 7, wherein a maximum width of each chamfered portion is from 0.8 to 5.0 times larger than the sipe width of the sipe.

9. The pneumatic tire according to claim 1, wherein a mounting direction of the pneumatic tire with respect to a vehicle is designated, and a distance D that is a distance in the tire lateral direction from the end portion positioned on a vehicle outer side, of both the end portions of the sipe, to the main groove, and a distance D' that is a distance in the tire lateral direction from the end portion positioned on a vehicle inner side, of both the end portions of the sipe, to the main groove, have a relationship of D>D'.

10. The pneumatic tire according to claim 1, wherein the sipe is inclined with respect to the tire circumferential direction.

11. The pneumatic tire according to claim 10, wherein an acute angle-side inclination angle of the sipe with respect to the tire circumferential direction is from 40° to 80°.

12. The pneumatic tire according to claim 10, wherein each chamfered portion is arranged on an acute angle side of the sipe.

13. The pneumatic tire according to claim 10, wherein each chamfered portion is arranged on an obtuse angle side of the sipe.

14. The pneumatic tire according to claim 1, wherein at least a part of the sipe is curved or bent in a plan view.

15. The pneumatic tire according to claim 1, wherein an overlap length, over which the chamfered portion formed on the leading-side edge of the sipe and the chamfered portion formed on the trailing-side edge of the sipe overlap each other, is from −30% to 30% of the sipe length.

16. The pneumatic tire according to claim 1, wherein a maximum width of each chamfered portion is from 0.8 to 5.0 times the sipe width of the sipe.

17. The pneumatic tire according to claim 1, wherein each chamfered portion extends in parallel with the sipe.

18. The pneumatic tire according to claim 1, wherein the chamfered portion on the leading-side edge terminates at a first one of the end portions of the sipe where the first one of the end portions terminates inside the rib and the chamfered portion on the trailing-side edge terminates at a second one of the end portions of the sipe opposite the first one of the end portions where the second one of the end portions terminates inside the rib.

* * * * *